UNITED STATES PATENT OFFICE 2,258,162

POLYSULPHANILAMIDOAROMATIC, POLYSULPHANILAMIDOALIPHATIC AND RELATED COMPOUNDS AND A PROCESS FOR MAKING THEM

Elmore H. Northey, Bound Brook, and Martin E. Hultquist, North Plainfield, N. J., assignors, by mesne assignments, to American Cyanamid Company, New York, N. Y., a corporation of Maine No Drawing. Application April 16, 1938, Serial No. 202,450

19 Claims. (Cl. 260—397.7)

This invention relates to polysulphonamido compounds in which two or more sulphonamido groups, one of which is a sulphanilamido group, are attached to an aromatic or aliphatic radical, and the invention also includes processes of preparing these compounds.

The compounds of the present invention, which may be represented by the following general formula:

$$R_1-SO_2-NH-R_2[N-(X)-SO_2-R_3]_n$$

in which $R_1$ is a para aminoaryl radical, $R_2$ is a residue of an aromatic or aliphatic polyamine, $R_3$ is an aromatic radical, $X$ is hydrogen, alkyl or substituted alkyl and $n$ is a small whole number, are of importance as chemo-therapeutic agents against bacterial and virus infections and many of them may also be used as dyestuff intermediates. The presence of at least one para aminoarylsulphon group is an essential feature of the present invention as most effective therapeutic agents contain at least one of these groups. It will be noted that all of the compounds are sulphonamide derivatives of an aromatic or aliphatic polyamine, the residue of which is given as $R_2$ in the general formula.

The sulphonamide derivatives of the polyamines may be of the most various nature so long as at least one para aminoarylsulphon radical is united to one of the amino groups. The best therapeutic agents are obtained where both the radicals $R_1$ and $R_3$ are aminoaryl radicals and particularly para aminoaryl radicals and these constitute the preferred members of the class covered by the present invention.

The various aryl radicals are preferably unsubstituted except by amino, sulphonamido and sulphonic groups where maximum activity is desired but substituted compounds in which the substituents may be alkyl, halogen, nitro, and the like are useful as dyestuff intermediates and are included in the present invention.

The most important compounds of the present invention are those in which the various aryl radicals belong to the benzene, diphenyl and naphthalene series but the invention is in no sense limited to such compounds. On the contrary, other aryl radicals such as diphenyloxide, anthracene, phenanthrene and the like may be present.

While the invention is not broadly limited to any particular process, I have found that a very desirable process, particularly for the production of symmetrical compounds, is to react acylaminoarylsulphonchlorides on the desired aromatic or aliphatic diamine and then hydrolyzing the acylamino groups if the unacylated amino compound is desired. In the examples the most common acyl group, namely, the acetyl group, is described. The particular acyl group does not materially affect the process and any of the other common acyl groups may be substituted for the acetyl group.

The invention will be described in detail in conjunction with the following specific examples which illustrate typical products covered in the present invention and methods for making them. The parts are by weight.

EXAMPLE 1

*1,2-Bis-sulphanilamidobenzene*

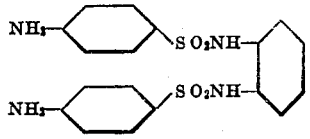

468 parts of freshly prepared N-acetylsulphanilyl chloride are added with efficient agitation over a period of two hours to 108 parts of fresh ortho phenylenediamine dissolved in 2000 parts of water containing 40 parts of soda ash. 50% sodium hydroxide is added as required to maintain the pH of the mixture at 8 to 9 and the temperature is held at approximately 40° C. Under these conditions the soluble disodium salt of 1,2-bis-(N-acetylsulphanilamido) benzene is formed; at higher or lower pH's, material tends to precipitate out.

A sample of the solution is titrated with N/10 nitrite solution. If more than .05 equivalent of free amino nitrogen is present, additional N-acetylsulphanilyl chloride is added until there is no further reduction in free amino nitrogen.

Hydrolysis of the acetyl groups may be effected by adding 200 parts of caustic soda to the solution of disodium 1,2-bis-(N-acetylsulphanilamido) benzene and boiling until there is no further increase in diazotizable amino groups. This will normally take from 1½ to 2 hours. An alternate procedure of hydrolysis consists in acidifying the solution with hydrochloric acid to a pH of 4 to 5 and crystallizing the intermediate compound obtained which is then filtered and washed. This intermediate compound may be hydrolyzed by boiling with 250 parts of sodium hydroxide dissolved in 1000 parts of water. This second procedure eliminates some highly colored impurities and makes the subsequent purification easier.

In either case, purification may be effected by acidifying the hydrolysis mixture to a pH of 5 to 6 and filtering. The liquor is discarded and the crystals dissolved in 1000 parts of hot water with an excess of hydrochloric acid, treated with decolorizing carbon and a pinch of sodium hydrosulphite and then neutralized with sodium hydroxide. The sticky precipitate is filtered off and recrystallized twice from 1500 cc. of 60% alcohol using decolorizing carbon.

The final product is a white crystalline compound which melts at 187.3° to 188.7° C. Assay by nitrite indicates 100.3%.

The corresponding naphthalene compound can be prepared by replacing the ortho phenylenediamine with an equivalent quantity of a naphthalenediamine, such as 1,4-diaminonaphthalene.

EXAMPLE 2

1,3-Bis-sulphanilamidobenzene

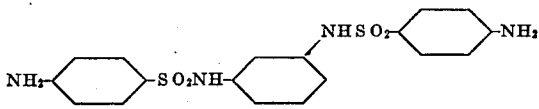

The procedure of Example 1 is followed, replacing the ortho phenylenediamine by an equal amount of meta phenylenediamine. Crystallization of the crude 1,3-bis-sulphanilamidobenzene is best effected from acetone or from an acetone-water mixture. The purified product must be dried at 90° C. under a vacuum to remove water of crystallization.

The white, crystalline compound melts at 220.5° to 221.7° C. and assay by nitrite indicates 100.0%.

EXAMPLE 3

1,4-Bis-sulphanilamidobenzene

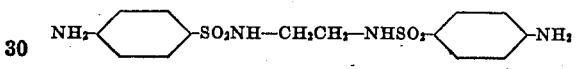

The procedure of Example 1 is followed, replacing the ortho phenylenediamine by an equal amount of para phenylenediamine and using 4000 parts of water. Crystallization of the crude 1,4-bis-sulphanilamidobenzene is best effected from acetone containing 10% water. The compound crystallizes as a hydrate which is dehydrated by drying at 90° C. for 24 hours. The anhydrous material is only slightly soluble in dry acetone, decomposes above 270° C. and assay by nitrite on anhydrous material indicates 100.2%.

The corresponding naphthalene compound can be prepared by substituting 1-acetylaminonaphthalene-4-sulphonchloride for the N-acetylsulphanilylchloride.

EXAMPLE 4

1,3,5-Trisulphanilamidobenzene

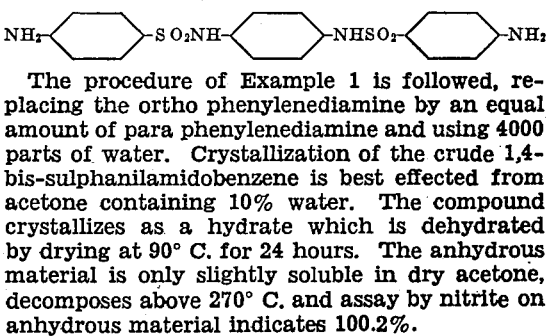

77.5 parts of 1,3,5-triaminobenzene trihydrochloride dissolved in 500 parts of water are neutralized with 50% sodium hydroxide solution and 20 parts of soda ash and 2 parts of sodium hydrosulphite added. 234 parts of N-acetylsulphanilylchloride are then added with vigorous agitation over a period of 2 hours at 35° C., maintaining a pH of 8 to 11 by addition of 50% sodium hydroxide solution as necessary. Additional small amounts of N-acetylsulphanilyl chloride are added until the test for diazotizable amine reaches a minimum value. The reaction mixture is then acidified to a pH of 3 to 4 and the heavy precipitate filtered off and washed with water.

Hydrolysis of the acetyl groups is effected by boiling the precipitate with a mixture of 120 parts of sodium hydroxide and 500 parts of water for two hours. The dark brown solution obtained is diluted to 2000 parts, treated first with decolorizing carbon and then with about 1 part of sodium hydrosulphite, and then acidified with hydrochloric acid to a pH of 5 to 6. The heavy gray precipitate is dissolved and reprecipitated twice, then dissolved in a mixture of 1500 parts of acetone and 1000 parts of hot water and treated three times with decolorizing carbon.

Crystallization of the product is brought about by evaporating off about 800 parts of acetone under a vacuum. The crude crystals obtained are filtered off, washed with acetone and recrystallized from 60% acetone.

Nitrite titration gives an equivalent weight of 197 as against 196.2 of theory and the 1,3,5-trisulphanilamidobenzene decomposes at 335° to 340° C.

EXAMPLE 5

1,2-Bis-sulphanilamidoethane

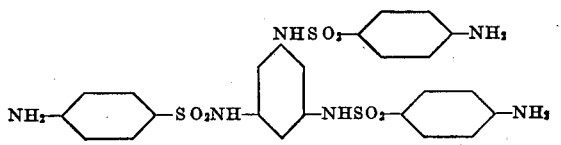

234 parts of freshly prepared N-acetylsulphanilylchloride are added over a period of 1 hour to 30 parts of ethylenediamine dissolved in 1500 parts of water at a temperature of 40° to 45° C. and a pH of 8 to 10 maintained by addition of 50% sodium hydroxide solution as necessary. The mixture is stirred for 1 hour, after which 120 parts of sodium hydroxide are added and the mixture boiled for two hours. The hydrolysis mixture is neutralized to a pH of 5 to 6 with hydrochloric acid and the crystalline precipitate filtered off.

Purification is best effected by dissolving the crude 1,2-bis-sulphanilamidoethane in 1000 parts of water with a minimum amount of sodium hydroxide, treating with decolorizing carbon and reprecipitating with acid. The precipitate is then dissolved in 1000 parts of water containing hydrochloric acid, treated with decolorizing carbon, neutralized with sodium hydroxide and washed free of salt with distilled water. The white crystalline compound, almost insoluble in water but readily soluble in strong acids or bases, melts at 228° to 230° C. with slow decomposition. Assay by nitrite indicates 100%.

EXAMPLE 6

$N^1,N^1$-Bis-(2-sulphanilamidoethyl) sulphanilamide $NH_2{-}\langle{-}\rangle{-}SO_2N(CH_2CH_2{-}NHSO_2{-}\langle{-}\rangle{-}NH_2)_2$ 701 parts of N-acetylsulphanilylchloride are added with vigorous agitation at 35° C. to 104 parts of diethylenetriamine dissolved in 1500 parts of water, a pH of 10 to 11 being maintained by the addition of 50% sodium hydroxide solution as necessary. The mixture is acidified with hydrochloric acid and the sticky precipitate filtered, dissolved in 1000 parts of water and 250 parts of concentrated hydrochloric acid, treated with decolorizing carbon, cooled and crystallized. The crude $N^1,N^1$-bis-(2-sulphanilamidoethyl)-sulphanilamide trihydrochloride is recrystallized from 500 parts of water using decolorizing carbon.

Nitrite titration gives an equivalent weight of 227.3 as against the theory of 226 and the compound melts at 241.5° to 244° C.

EXAMPLE 7

*Sodium 3,4-bis-sulphanilamidobenzenesulphonate*

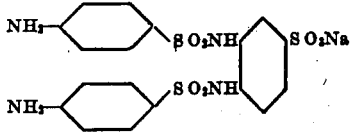

The procedure of Example 1 is followed starting with 210 parts of freshly prepared sodium 1,2-diaminobenzene-4-sulphonate instead of the ortho phenylenediamine and only half the quantity of water is needed.

Purification of the crude product is effected by dissolving at a pH of 5 to 6 with sodium hydroxide, treating first with decolorizing carbon, then with a little sodium hydrosulphite and then slowly acidifying to a pH of 2 to 3. Several recrystallizations are necessary to remove the highly colored impurities present. The sodium salt of the compound is finally obtained on cooling the clarified solution at a pH of 5 to 6. The white crystalline product is dried at 100° C., after which nitrite titration gives an equivalent weight of 259 as against a theory of 260.2. The compound gradually melts to a viscous mass above 200° C.

EXAMPLE 8

*Sodium 2,4-bis-sulphanilamidobenzenesulphonate*

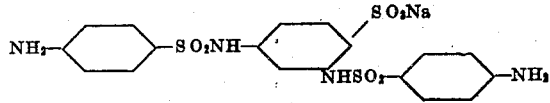

The procedure of Example 7 is followed starting with sodium 2,4-diaminobenzenesulphonate instead of sodium 1,2-diaminobenzene-4-sulphonate. The crude product is recrystallized by dissolving at a pH of 9 to 10 and reprecipitating at a pH of 5 to 6. The monosodium salt is sparingly soluble in water but very soluble in acids or bases.

Sodium nitrite titration gives an equivalent weight of 260.4 as against a theory of 260.2.

EXAMPLE 9

*Sodium 2,5-bis-sulphanilamidobenzenesulphonate*

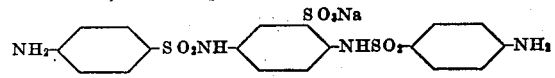

The procedure of Example 7 is followed starting with sodium 2,5-diaminobenzenesulphonate instead of sodium 1,2-diaminobenzene-4-sulphonate. The crude product is recrystallized by dissolving as the sodium salt in water and precipitating as the free acid with hydrochloric acid added to a pH of 3 to 4. The free acid is sparingly soluble in water but very soluble in acids or bases. The sodium salt is finally crystallized from concentrated solution at a pH of 5 to 6.

Sodium nitrite titration given an equivalent weight of 260.4 as against a theory of 260.2.

EXAMPLE 10

*Sodium, 2,4-bis-sulphanilamidotoluene-5-sulphonate*

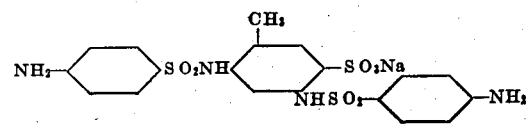

The procedure of Example 7 is followed starting with 224 parts of sodium 2,4-diaminotoluene-5-sulphonate instead of sodium 1,2-diaminobenzene-4-sulphonate. The product decomposes above 300° C. and a sodium nitrite titration gives an equivalent weight of 266 as against the theory of 267.2.

EXAMPLE 11

*Disodium 2,4-bis-sulphanilamidobenzene-1,5-disulphonate*

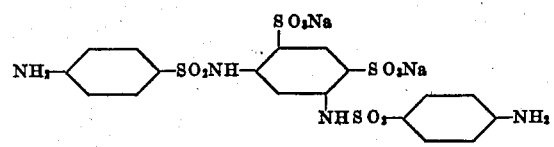

The procedure of Example 7 is followed starting with 268 parts of 2,4-diaminobenzene-1,5-disulphonic acid. When the hydrolysis mixture is acidified to a pH of 3 to 4 sulphanilic acid precipitates first. The filtrate is neutralized to a pH of 7 to 8, concentrated, cooled and the crystalline precipitate separated and recrystallized from 50% alcohol using decolorizing carbon. The white crystalline compound gives an equivalent weight of 305 by sodium nitrite titration as against 311.2 of theory for the disodium salt.

EXAMPLE 12

*Sodium 2,4-bis-(N⁴-sulphanilylsulphanilamido)-benzenesulphonate*

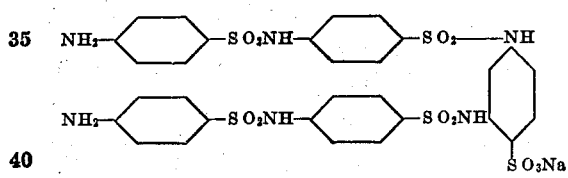

234 parts of freshly prepared N-acetylsulphanilylchloride paste are added over a period of 2 hours with vigorous agitation at approximately 40° C. to 260 parts of sodium 2,4-bis-sulphanilamidobenzenesulphonate dissolved in 1000 parts of water with sodium hydroxide added to a pH of 9 to 10. Additional 50% sodium hydroxide solution is added from time to time to maintain a pH of 8 to 10. Additional small portions of N-acetylsulphanilylchloride are added until a minimum value is reached when testing for diazotizable amine. The reaction mixture is then acidified to a pH of 1 to 2 and the sticky precipitate separated and hydrolized by boiling with 200 parts of sodium hydroxide and 1500 parts of water until there was no further increase in diazotizable amino nitrogen (approximately 2 hours). A taffy-like mass of crude product, obtained when the solution is cooled and acidified to a pH of 1.5 to 2.5, is separated, dissolved in 3000 parts of boiling water with the addition of a little sodium hydroxide solution to bring the pH to about 3.5, treated with decolorizing carbon and the filtrate treated with about 1 part of sodium hydrosulphite. The product again separates as an amorphous mass when re-acidified and is dissolved in 1500 parts of hot water with sufficient sodium hydroxide to bring it to a pH of 5 to 6. It is again treated with decolorizing carbon and set aside to crystallize overnight. When the crystals are filtered off, washed, and dried in a vacuum at 100° C., a sodium nitrite titration shows an equivalent weight of 428 as against the theory of 431.

Example 13

*1,2-Bis-(N⁴-sulphanilylsulphanilamido)ethane*

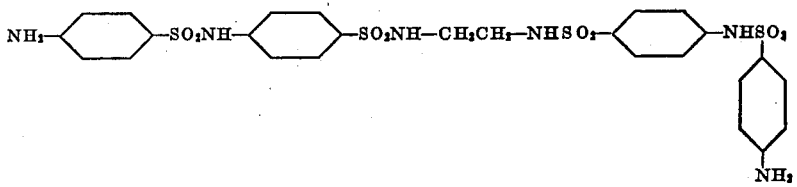

The procedure of Example 12 is followed using double the volume of water and starting with 186 parts of 1,2-bis-sulphanilamidoethane. Nitrite titration gives an equivalent weight of 338 as against 340.2 for theory. The product melts indefinitely from 120° to 160° C., forming a clear, glass-like brittle solid on cooling.

Example 14

*1-N⁴-(p-toluenesulphonyl)-sulphanilamido-4-(p-toluenesulphanilamide) benzene*

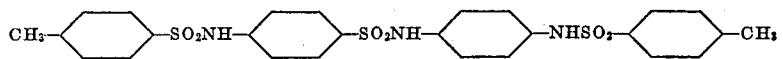

400 parts of para toluenesulphonylchloride are added with agitation over a period of a half hour at 50° to 60° C. to a suspension of 130 parts of 4-aminosulphanilanilide in 2500 parts of water and 25 parts of soda ash, the pH being kept at 9 to 11 by the addition of 50% sodium hydroxide solution as necessary. The temperature is then raised to 80° to 90° C. and held there until the test for diazotizable amine disappears and the excess para toluenesulphonylchloride is hydrolyzed. The solution is treated first with decolorizing carbon, then with a small amount of sodium hydrosulphite and then acidified with hydrochloric acid. The dark amorphous mass obtained is redissolved in 2500 parts of alcohol, treated with decolorizing carbon four times and then poured into 10,000 parts of cold water. A white amorphous precipitate is obtained which is readily filterable and after drying at 50° C. the material melts indefinitely from 100° to 150° C., forming a clear, glass-like brittle solid on cooling.

Example 15

*1,3-Bis-sulphanilamidopropanol-2*

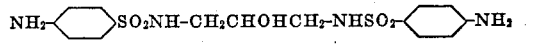

468 parts of N-acetylsulphanilyl chloride are added with efficient agitation over a period of an hour at 40° to 45° C. to 86 parts of 1,3-diaminopropanol dissolved in 800 parts of water, the pH being maintained at 8 to 10 by the addition of sodium hydroxide as necessary. The crude reaction product separates to form a slurry. This is dissolved in excess sodium hydroxide, the solution clarified and acidified with hydrochloric acid. The crude diacetyl compound is filtered off and boiled with 200 parts of sodium hydroxide and 800 parts of water for 2 hours. The hydrolysis mixture is diluted to 3000 parts and acidified with hydrochloric acid. The resulting white precipitate is filtered off, dissolved in 1500 parts of water and 250 parts of concentrated hydrochloric acid, treated with decolorizing carbon and then neutralized with sodium hydroxide. The product is finally recrystallized from 50% alcohol. Sodium nitrite titration gives an equivalent weight of 200 as against a theory of 200.2. The compound melts at 184.2° to 186.5° C.

Example 16

*N,N¹ - Disulphanilylbenzidine-2,2'-disodium sulphonate*

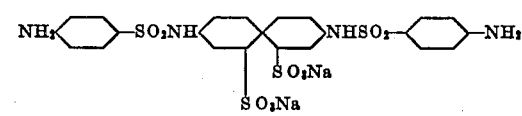

344 parts of benzidine-2,2'-disulphonic acid is dissolved in 3000 parts of water with 80 parts of caustic soda and 75 parts of soda ash. A paste containing 468 parts of acetylsulphanilyl chloride is gradually added with agitation while maintaining the pH from 8 to 10 by addition of 50% caustic soda solution as necessary. The temperature is held from 40° to 50° C. by the addition of ice. When reaction is complete, as indicated by a nitrite titration, the reaction mixture is acidified and a clear jelly is formed. The mixture can be precipitated in a form in which it is readily filterable by adding concentrated hydrochloric acid to the solution at 60° to 70° C. until a pH of 2 to 3 is obtained and then cooling very slowly, preferably over-night. The filter cake is hydrolyzed by boiling for 1½ hours with 300 parts of concentrated hydrochloric acid and 200 parts of water. The slurry is cooled and filtered, the filter cake dissolved in 500 parts of boiling water with addition of caustic soda until neutral, then treated with decolorizing carbon, cooled and the disodium salt permitted to crystallize out. The crystals are dried at 85° C.

Example 17

*4,4'-Disulphanilamidostilbene-2,2'-disulphonic acid*

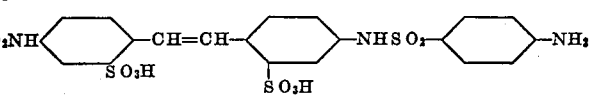

184 parts of 4,4'-diaminostilbene-2,2'-disulphonic acid are dissolved in 1000 parts of water with 80 parts of caustic soda and 30 parts of soda ash. A paste containing 281 parts of acetylsulphonilyl chloride is gradually added with agitation, keeping the reaction mixture at a pH of 8 to 10 by addition of 50% caustic soda solution as necessary. The temperature is held at 40° to 50° C. by the addition of ice.

The solution is clarified and slowly acidified with hydrochloric acid to precipitate 4,4'-diacetylsulphanilamidostilbene-2,2'-disulphonic acid in crystalline form. The acidity should be such that Congo just turns red. The mixture is filtered and the filter cake washed to remove any colored impurities. The cake is then boiled for 4 hours with 250 parts of concentrated hydrochloric acid. After the hydrolysis has been completed, the slurry is filtered and the precipitate thoroughly washed with water. The free acid is very insoluble in water and is recrystallized by forming the sodium salt, dissolving in water and reprecipitating with acid. The material is sensitive to light and oxidation.

What we claim is:

1. Sulphonamido compounds having the following general formula:

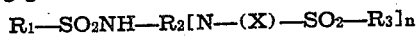

in which $R_1$ is a para aminoaryl radical linked to the $SO_2$ group through a nuclear carbon atom, $R_2$ is a polyvalent radical included in the group consisting of polyvalent aryl and open chain saturated aliphatic radicals, $R_3$ is an aryl radical, X is a radical included in the group consisting of hydrogen and radicals of the paraffin series, and $n$ is a small whole number.

2. Sulphonamido compounds having the following general formula:

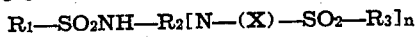

in which $R_1$ and $R_3$ are para aminoaryl radicals linked to the $SO_2$ groups through nuclear carbon atoms, $R_2$ is a polyvalent radical included in the group consisting of polyvalent aryl and open chain saturated aliphatic radicals, X is a radical included in the group consisting of hydrogen and radicals of the paraffin series, and $n$ is a small whole number.

3. Sulphonamido compounds having the following general formula:

in which $R_1$ is a para aminoaryl radical linked to the $SO_2$ group through a nuclear carbon atom, $R_2$ is a polyvalent aryl radical, $R_3$ is an aryl radical, X is a radical included in the group consisting of hydrogen and radicals of the paraffin series, and $n$ is a small whole number.

4. Sulphonamido compounds having the following general formula:

in which $R_1$ is a para aminoaryl radical linked to the $SO_2$ group through a nuclear carbon atom, $R_2$ is a polyvalent saturated open chain aliphatic radical, $R_3$ is an aryl radical, X is a radical included in the group consisting of hydrogen and radicals of the paraffin series, and $n$ is a small whole number.

5. Sulphonamido compounds having the following general formula:

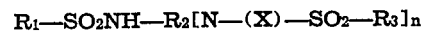

in which $R_1$ is a para aminoaryl radical linked to the $SO_2$ group through a nuclear carbon atom, $R_2$ is a polyvalent radical of the benzene series, $R_3$ is an aryl radical, X is a radical included in the group consisting of hydrogen and radicals of the paraffin series, and $n$ is a small whole number.

6. Sulphonamido compounds having the following general formula:

in which $R_1$ and $R_3$ are para aminoaryl radicals linked to the $SO_2$ groups through nuclear carbon atoms, $R_2$ is a polyvalent radical of the benzene series, X is a radical included in the group consisting of hydrogen and radicals of the paraffin series, and $n$ is a small whole number.

7. Sulphonamido compounds having the following general formula:

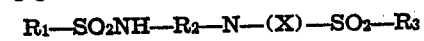

in which $R_1$ and $R_3$ are para aminoaryl radicals linked to the $SO_2$ groups through nuclear carbon atoms, $R_2$ is a meta phenylene radical, and X is a radical included in the group consisting of hydrogen and radicals of the paraffin series.

8. Sulphonamido compounds having the following general formula:

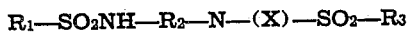

in which $R_1$ and $R_3$ are para aminoaryl radicals linked to the $SO_2$ groups through nuclear carbon atoms, $R_2$ is a para phenylene radical, and X is a radical included in the group consisting of hydrogen and radicals of the paraffin series.

9. Sulphonamido compounds having the following general formula:

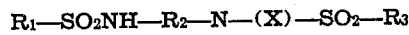

in which $R_1$ and $R_3$ are para aminoaryl radicals linked to the $SO_2$ groups through nuclear carbon atoms, $R_2$ is a sulphonated phenylene radical, and X is a radical included in the group consisting of hydrogen and radicals of the paraffin series.

10. Sulphonamido compounds having the following general formula:

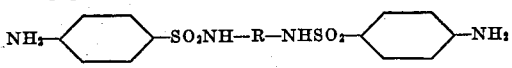

in which R is a phenylene radical.

11. Sulphonamido compounds having the following general formula:

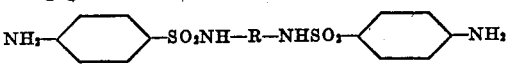

in which R is a meta phenylene radical.

12. Sulphonamido compounds having the following general formula:

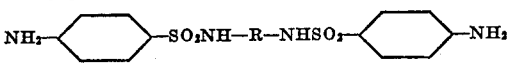

in which R is a para phenylene radical.

13. The sulphonamido compound having the following formula:

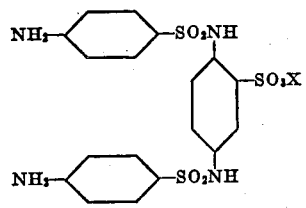

where X is a radical included in the group consisting of hydrogen and alkali metals.

14. The sulphonamido compound having the following formula:

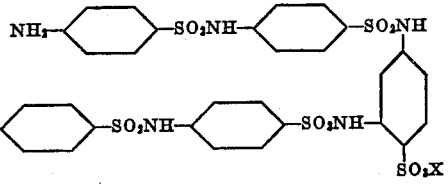

where X is a radical included in the group consisting of hydrogen and alkali metals.

15. A method of preparing sulphonamide compounds having the following general formula:

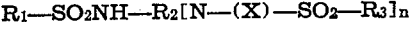

in which $R_1$ is a para aminoaryl radical linked to the $SO_2$ group through a nuclear carbon atom, $R_2$ is a polyvalent radical included in the group consisting of polyvalent aryl and open chain saturated aliphatic radicals, $R_3$ is an aryl radical, X is a radical included in the group consisting of hydrogen and radicals of the paraffin series, and $n$ is a small whole number, which comprises reacting N-acylarylsulphonyl halides on a polyamine included in the group consisting of aryl polyamines and aliphatic polyamines, the acyl group being the acidic residue of an organic carboxylic acid, the amount of the N-acylarylsulphonyl halide being at least twice the stoichiometric equivalent of the polyamine.

16. A method according to claim 15 in which all of the arylsulphonyl halides are acyl-p-aminoarylsulphonyl halides.

17. A method of producing sulphonamide compounds having the following general formula:

$$R_1-SO_2NH-R_2[N-(X)-SO_2-R_3]_n$$

in which $R_1$ and $R_3$ are para aminoaryl radicals linked to the $SO_2$ groups through nuclear carbon atoms, $R_2$ is a polyvalent aryl radical, $X$ is a radical included in the group consisting of hydrogen and radicals of the paraffin series, and $n$ is a small whole number, which comprises reacting para acylaminoarylsulphonyl halide on a diamine included in the group consisting of aryl diamines and aliphatic diamines, the acyl group being the acidic residue of an organic carboxylic acid, the amount of the para acylaminoarylsulphonyl halide being at least twice the stoichiometric equivalent of the diamine.

18. A method of preparing sulphonamide compounds having the following general formula:

$$R_1-SO_2NH-R_2-N-(X)-SO_2-R_3$$

in which $R_1$ and $R_3$ are para aminoaryl radicals linked to the $SO_2$ groups through nuclear carbon atoms, $R_2$ is a polyvalent radical included in the group consisting of arylene and alkylene radicals, and $X$ is a radical included in the group consisting of hydrogen and radicals of the paraffin series, which comprises reacting a para acylaminoarylsulphonyl halide with a diamine included in the group consisting of aryl and aliphatic diamines, the acyl group being the acidic residue of an organic carboxylic acid, the amount of the para acylaminoarylsulphonyl halide being at least twice the stoichiometric equivalent of the diamine.

19. A method of preparing sulphonamide compounds having the following general formula:

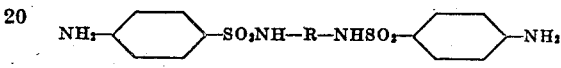

wherein R is a phenylene radical, which comprises reacting an N-acetylaminobenzenesulphonyl halide with a phenylene diamine, the amount of the N-acetylaminobenzenesulphonyl halide being at least twice the stoichiometric equivalent of the diamine.

ELMORE H. NORTHEY.
MARTIN E. HULTQUIST.